US007046829B2

(12) United States Patent
Udupa et al.

(10) Patent No.: US 7,046,829 B2
(45) Date of Patent: May 16, 2006

(54) FINGERPRINT VERIFICATION

(75) Inventors: Raghavendra U Udupa, New Delhi (IN); Gaurav Garg, Haryana (IN); Pramod Kumar Sharma, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 09/872,423

(22) Filed: May 30, 2001

(65) Prior Publication Data

US 2005/0058325 A1    Mar. 17, 2005

(51) Int. Cl.
    *G06K 9/00* (2006.01)
(52) U.S. Cl. .............. 382/124; 382/125; 382/115; 382/225; 382/257; 340/5.53; 340/5.83
(58) Field of Classification Search ........ 382/124–125, 382/115, 225, 257; 340/5.53, 5.83
See application file for complete search history.

(56) References Cited

U.S. PATENT DOCUMENTS

| | | | | |
|---|---|---|---|---|
| 4,135,147 | A * | 1/1979 | Riganati et al. | 382/125 |
| 4,581,760 | A | 4/1986 | Schiller et al. | |
| 5,040,223 | A | 8/1991 | Kamiya et al. | |
| 5,261,008 | A | 11/1993 | Yamamoto | 382/127 |
| 5,524,161 | A * | 6/1996 | Omori et al. | 382/125 |
| 5,613,014 | A | 3/1997 | Eshera et al. | 382/124 |
| 5,631,971 | A | 5/1997 | Sparrow | 382/125 |
| 5,631,972 | A | 5/1997 | Ferris et al. | 382/125 |
| 5,761,330 | A | 6/1998 | Stoianov et al. | 382/127 |
| 5,982,913 | A | 11/1999 | Brumbley et al. | 382/124 |
| 6,041,133 | A * | 3/2000 | Califano et al. | 382/124 |
| 6,075,876 | A | 6/2000 | Draganoff | 382/124 |
| 6,546,122 | B1 * | 4/2003 | Russo | 382/125 |

OTHER PUBLICATIONS

B.M. Mehtre, "Fingerprint Image Analysis for Automatic Identification," Machine Vision and Applications, Springer-Verlag, vol. 6, (1) No. 2-3, pp. 124-139, 1993.*
A. Jain, L. Hong, R. Bolle, "*On-Line Fingerprint Verification*," IEEE Transactions on Pattern Analysis and Machine Intelligence, 19(4), Apr., 1997, pp. 302-314.

(Continued)

*Primary Examiner*—Bhavesh M. Mehta
*Assistant Examiner*—John Strege
(74) *Attorney, Agent, or Firm*—Gibb I.P. Law Firm, LLC; T. Rao Coca, Esq.

(57) ABSTRACT

Fingerprint verification matching a claimant fingerprint with one of a number of recorded enrollee fingerprints uses various adaptations of model alignment techniques involving affine transformation to provide an algorithm providing relatively fast and accurate verification suitable for realtime applications. These techniques involve sampling minutiae into subsets based on geometrical proximity to a particular index minutiae for each subset, eliminating minutiae which are near the fingerprint boundary, ordering the minutiae of each subset in a predetermined manner, classifying each subset in bins which discriminate on the properties of the subsets, checking transformations proposed as matches between fingerprints for consistency with each other, and checking the topological as well as the geometrical correspondence of potentially matching fingerprints. In a preferred form, a score indicative of the correlation between fingerprints is used to ultimately decide whether the fingerprints match.

46 Claims, 9 Drawing Sheets

OTHER PUBLICATIONS

D.M. Weber, "*A Cost Effective Fingerprint Verification Algorithm for Commercial Applications,*" Communications and Signal Processing, 1992. COMSIG 92. Proceedings of the 1992 South African Symposium on 1992, pp. 99-104.

C.A. Gunawardena, V.K. Sagar, "*Fingerprint Verification Using Coincident Sequencing and Thinning,*" Industrial Electronics, Control and Instrumentation, 1991. Proceedings, IECON 92. 1991 International Conference on: 1991, pp. 1917-1922.

C.A. Gunawardena, V.K. Sagar, "*Coincident Sequencing for Fingerprint Verification,*" Circuits and Systems, 1990. Proceedings of the 33rd Midwest Symposium on ; 1991, pp. 845-848.

L. Hong, A. Jain, "*Integrating Faces and Fingerprints for Personal Identification,*" IEEE Transactions on Pattern Analysis and Machine Intelligence, 20(12), Dec. 1998, pp. 1295-1307.

A.K. Jain, L. Hong, S. Pankanti, R. Bolle, "*An Identity-Authentication System Using Fingerprints,*" Proceedings of the IEEE, 85(9), Sep. 1997, pp. 1365-1388.

F. Kuo-Chin, L. Cheng-Wen, W. Tuan-Ka, "*A Fuzzy Bipartite Weighted Graph Matching Approach to Fingerprint Verification,*" Systems, Man, and Cybernetics, 1998. 1998 IEEE International Conference on ; 1998. pp. 4363-4368.

A. Jain, W. Lin, "*On-Line Fingerprint Verification,*" Pattern Recognition, 1996, Proceedings of the 13th International Conference on; 1996, pp. 596-600.

H. Yahagi, S. Igaki, F. Yamagishi, "*Moving-Window Algorithm For Fast Fingerprint Verification,*" IEEE Proceedings—1990 Southeastcom, pp. 343-348.

F. Preston, "*Automatic Fingerprint Matching,*" Security Technology 1989 International Carnahan Conference on; pp. 199-202.

A. Wahab, S. H. Chin, E.C. Tan, "*Novel approach to automated fingerprint recognition,*" IEE Proc-Vis. Image Signal Process., 145(3), Jun. 1998, pp. 160-166.

R.S. Germain, A. Califano, S. Colville, "*Fingerprint Matching Using Transformation Parameter Clustering,*" IEEE Computational Science and Engineering, 4(4), Oct.-Dec. 1997, pp. 42-49.

Z. Chen, C.H. Kuo, "*A Topology-Based Matching Algorithm for Fingerprint Authentication,*" Security Technology, 1991. 21th Annual 1991 IEEE Proceedings, International Carnahan Conference on; pp. 84-87.

A.K. Jain, S. Prabhakar, L. Hong, S. Pankanti, "*Filterbank-Based Fingerprint Matching,*" IEEE Transactions on Image Processing, 9(5), May 2000, pp. 846-859.

\* cited by examiner

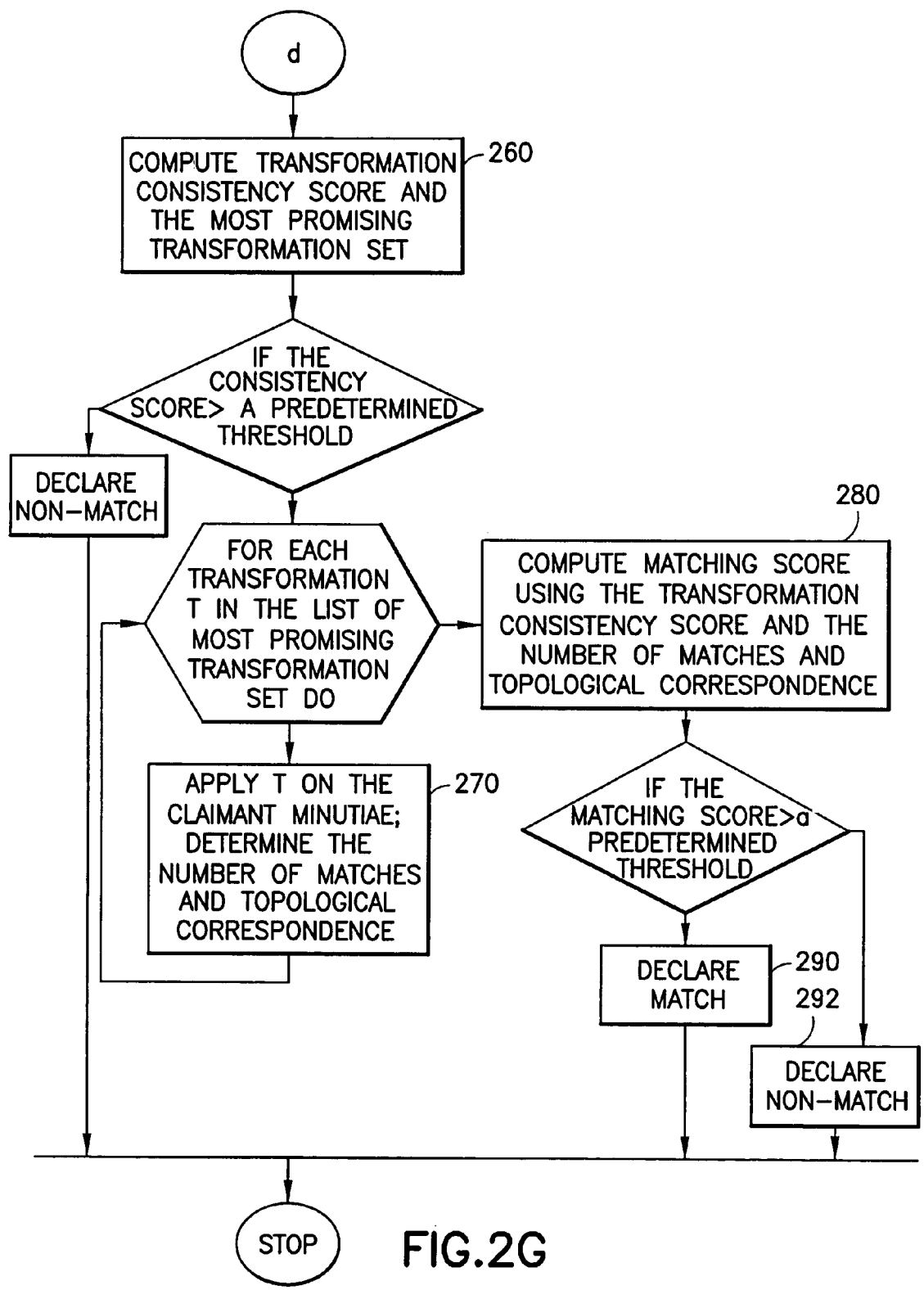

FINGERPRINT VERIFICATION

FIELD OF THE INVENTION

The invention relates to fingerprint verification and relates particularly, though not exclusively, to improved methods of real-time human fingerprint verification.

BACKGROUND OF THE INVENTION

Automatic authentication systems are employed in applications such as criminal identification, access control systems, and large-scale social service or national identity registry applications. With the emergence of new applications in e-commerce there is a renewed interest in fast and accurate personal identification. For example, in applications such as web-based retailing, autonomous vending, and automated banking, authentication of consumer identity is critical to prevent fraud.

Traditionally, fingerprints have been the most widely used and trusted biometric. The ease of acquisition of fingerprints, the availability of inexpensive fingerprint sensors and a long history of usage in personal identification make fingerprints the most accepted form of authentication at present.

Speed and accuracy are important for biometric authentication systems that operate in realtime applications requiring "on the spot" authentication of users. As noted, fingerprint verification is the biometric authentication method of choice. However, existing fingerprint verification methods necessarily compromise speed for accuracy or vice versa.

The process of fingerprint verification involves two phases: (1) enrolment and (2) matching. A database of the identities of users is maintained. The identity of a person consists of their fingerprint(s) together with other associated data relevant to the particular application (for example, name, age, sex, etc). In the enrolment phase, a person's identity is stored in the database. In the matching phase, the identity claimed by the claimant is verified against the identity stored in the database. If there is a match of the two identities the authentication system declares that the claimant is who they claim to be. The fingerprint stored in the database is the enrollee fingerprint and the fingerprint supplied by the claimant is the claimant fingerprint.

A fingerprint is characterized by smoothly flowing ridges and valleys. The ridge anomalies such as ridge endings and ridge bifurcations are known as "minutiae". Minutiae are used to determine whether two fingerprints are from the same finger. A feature-extractor provides suitable minutiae information.

The patterns formed by the alternating ridges and valleys are verified as unique to each person over a large population and have been used for personal verification over the past few centuries, primarily in forensic fields.

For automated fingerprint verification, a compact representation of the rich topology of valleys and ridges is desirable. Most automated fingerprint verification systems extract features from the fingerprint images and use the feature sets for verification. There are two basic types of ridge anomalies—ridge termination and ridge bifurcation. The number of minutiae in a fingerprint varies from print to print and typically a feature extractor reports 30 to 60 minutiae per print. In addition to the geometric location of each minutiae on the print, the following structural information is also reported:

1. The angle that the ridge makes at each minutiae with respect to the x-axis
2. The count of ridges between every pair of minutiae.

Fingerprint verification or one-to-one matching is the problem of confirming or denying a person's claimed identity by comparing a claimant fingerprint against an enrollee fingerprint.

There are various limitations associated with conventional methods of fingerprint verification.

1. The claimant fingerprint is seldom an exact copy of the enrollee fingerprint since there are three degrees of freedom. The three degrees of freedom are (a) translation along the x-axis, (b) translation along the y-axis, and (c) rotation.
2. Most fingerprints are affected to a greater or lesser extent by small to moderate amounts of elastic deformations. Elastic distortions destroy the distance relationships between some minutiae. Such deformations are non-linear (predominantly local) and occur because of pressure and torque variations during fingerprint acquisition.
3. Apart from sensory uncertainty, delocalization of minutiae as a result of feature extraction process is to be taken into account. A ridge is typically 3–5 pixels wide and ridge endings (and similarly, ridge bifurcations) are not represented by a single pixel but are spread over several pixels. Consequently, a feature extractor can pinpoint a minutia to an accuracy of 3–5 pixels.
4. The portion of the fingerprint captured in each image varies with the image. Therefore, the area common to two fingerprints may be small.
5. Most feature extractors report spurious minutiae and do not report some genuine minutiae. This issue is particular problematic especially when the images are of relatively poor quality.

Major approaches to verification algorithms include modelling the verification problem as:

1. a syntactic pattern recognition problem.
2. a graph matching problem.
3. a global geometric transformation problem.
4. an adaptive elastic string matching problem It is found, though, that none of these approaches necessarily address the universal problem of simultaneously achieving speed and accuracy suitable for realtime, security applications. In view of the above, it is clearly desirable to provide a method suitable for fingerprint verification which can be performed relatively quickly compared with existing methods, and which provides robust accuracy despite false minutiae, sensor uncertainty, and elastic deformation.

SUMMARY OF THE INVENTION

The following aspects of the invention involve a recognition that fingerprint verification can be advantageously improved by using a model-based approach to the recognition of fingerprints. In this context, the problem of fingerprint matching becomes one of matching corresponding feature sets. Embodiments of the invention use a combination of one or more techniques to achieve improvements in speed and/or accuracy of the resulting verification scheme.

Accordingly, the invention involves analysing a claimant fingerprint and an enrollee fingerprint to determine whether the fingerprints match. This analysis determines the geometrical correspondence between minutiae of the claimant fingerprint and minutiae of the enrollee fingerprint via affine transformation. The analysis is performed with the assistance of one or more techniques that are used to enhance the speed and/or accuracy of the verification scheme.

In some aspects, these techniques operate on one or more sets of minutiae from the claimant fingerprint and one or more sets of minutiae from the enrollee fingerprint. In some cases, particular subsets of minutiae are identified (each subset being associated with a particular index minutiae from the respective identified subset) and an analysis performed in respect of these subsets. An overview of the various aspects used to improve the speed and/or accuracy of verification is given below.

Sampling Based on Geometrical Nearness

Given a set of n minutiae, there are $2^n$ possible subsets of these minutiae. Sampling based on geometrical nearness allows this prohibitively large number of subsets to be reduced a substantially smaller number of subsets (typically, polynomial in n and linear in the described embodiment). Each minutiae in the subset is represented in the collection of subsets (that is, the geometry of minutiae around it is captured by these subsets). This technique records the geometry around a minutiae.

Sampling based on geometrical nearness reduces:
a. the number of edges in graph based techniques (i.e., to form a sparse graph from the minutiae).
b. the number of transformations to be evaluated by global transformation based techniques.
c. the number of structural matches to be computed in structure based techniques.

Sampling improves the speed of verification without sacrificing accuracy.

Elimination of Boundary Minutiae

A fingerprint image typically consists of a foreground (consisting of ridges, valleys, and minutiae) and a background. The part of the image where the foreground changes into background is called the border of the fingerprint. A scheme of eliminating certain minutiae from further processing based on their closeness to the fingerprint border is used to improve verification speed. This is often desirable in fingerprint technology since the minutiae at the border are usually false minutiae or not reproducible across several prints. This not only improves processing speed but also improves accuracy. A simple, computationally efficient method of checking whether a minutia is near the border involves finding a rectangle that encloses the minutiae.

Ordering Minutiae

There are several alternative methods which can be used to order minutiae in the subsets formed by the sampling process. Ordering minutiae in each subset allows a determination of correspondences between the minutiae of two subsets. Determining the transformation that maps one set of minutiae to another is simplified when the correspondences are known a priori.

Binning Sets of Minutiae

A subset of minutiae can be binned in various ways. Binning reduces the number of potential transformations that need to be analysed.

Early Elimination of Inconsistent Transformations

This technique involves checking for attribute invariance under transformations. In this case, as fingerprint verification, involves matching using a model-alignment algorithm, the transformation search space can be pruned effectively by checking for invariance of attributes under transformations.

Transformation Consistency Checking

Given a set of transformations, transformation consistency checking returns a subset of transformations all of which are consistent with some transformation T in the subset. In a preferred embodiment, the largest such subset of transformations is used. When two fingerprints actually match, the consistency score is found to be relatively high. Accordingly, making matching decisions based on this score is found to be reliable.

Topological Correspondence Verification

A computationally efficient scheme for verifying the topological correspondence between sets of minutiae is used to improve the robustness of fingerprint verification.

Embodiments of the invention use a fingerprint verification algorithm that is relatively fast and accurate compared with existing approaches and thus more suitable for use in a variety of applications including those requiring real-time authentication. An early elimination strategy is used involving a deterministic sampling technique, and the elimination of inconsistent transformations to improve verification speed. This elimination strategy is followed by a variety of measures improving accuracy, including a transformation consistency checking scheme to improve verification accuracy.

Preferred embodiments of the invention perform approximately 20 to 50 verifications in a second, on a typical general purpose computing hardware, making embodiments of the invention applicable to online applications which demand real-time performance. Verification is also reliable. The scheme is robust in the presence of false minutiae, and works satisfactorily even when the area common to the two fingerprints is very small. Embodiments can handle arbitrary amounts of rotation and translation, and do not make any assumption on the availability of singularities like core and delta in the fingerprint. Preferred embodiments are relatively robust to delocalization of minutiae and sensory uncertainty, and operate satisfactorily even when there is a substantial amount of elastic deformation. Further, the embodiments do not require sophisticated hardware and can be implemented on general purpose machines equipped with appropriate fingerprint reader hardware.

BRIEF DESCRIPTION OF THE DRAWINGS

FIGS. 2A to 2G collectively illustrate a more detailed flowchart of an algorithm for fingerprint verification in accordance with an embodiment of the invention.

DETAILED DESCRIPTION OF EMBODIMENTS AND BEST MODE

Figure 1:
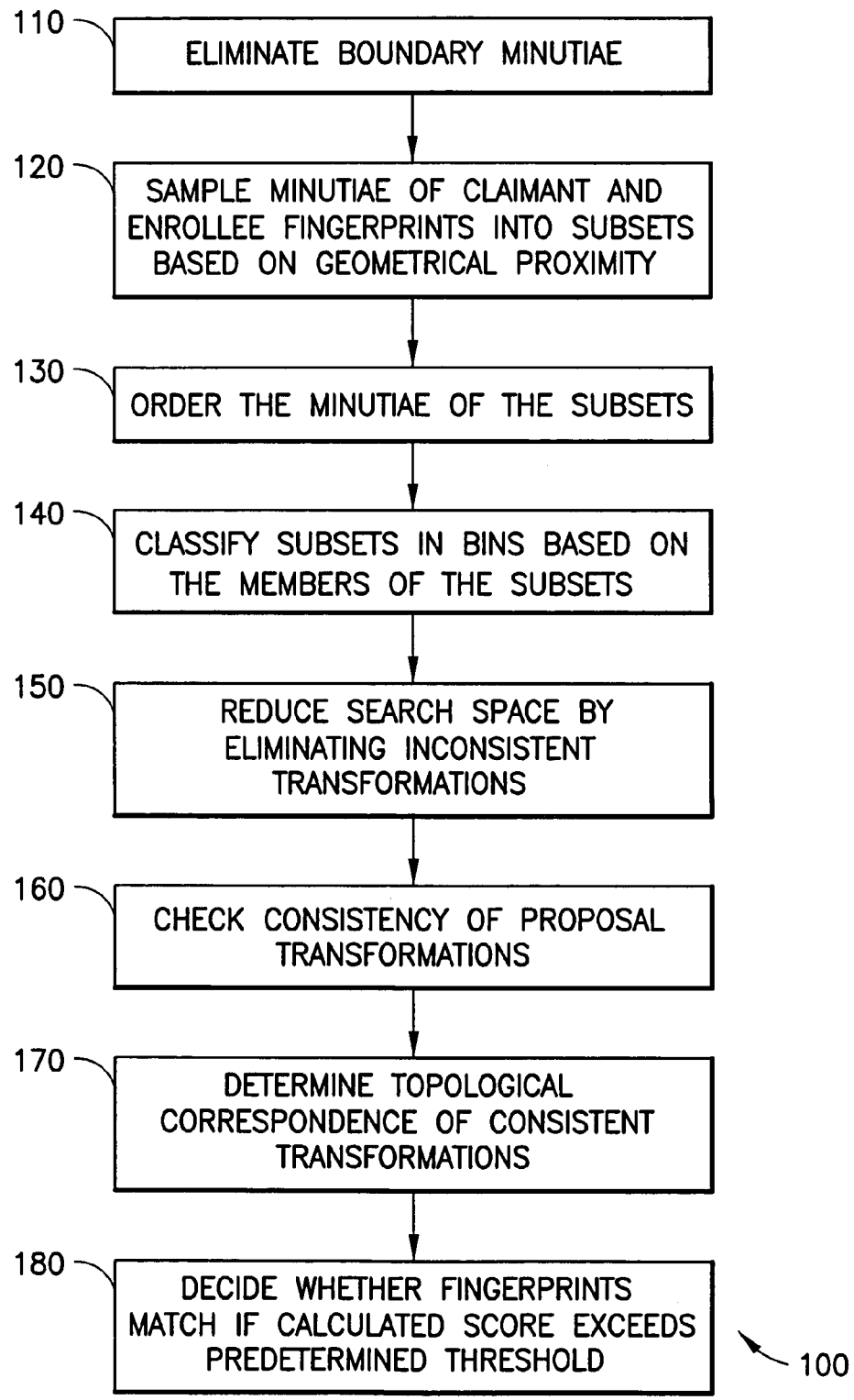
FIG. 1 is a flowchart illustrating the steps which occur in an algorithm for fingerprint verification in accordance with an embodiment of the invention.
Figure 2A:
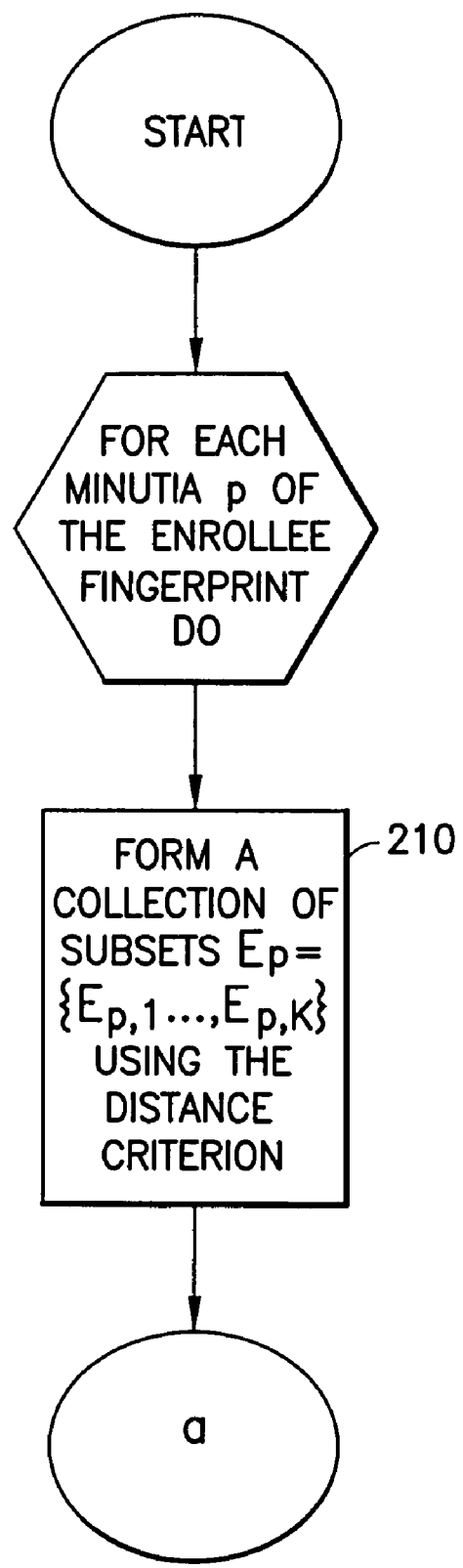
Figure 2B:
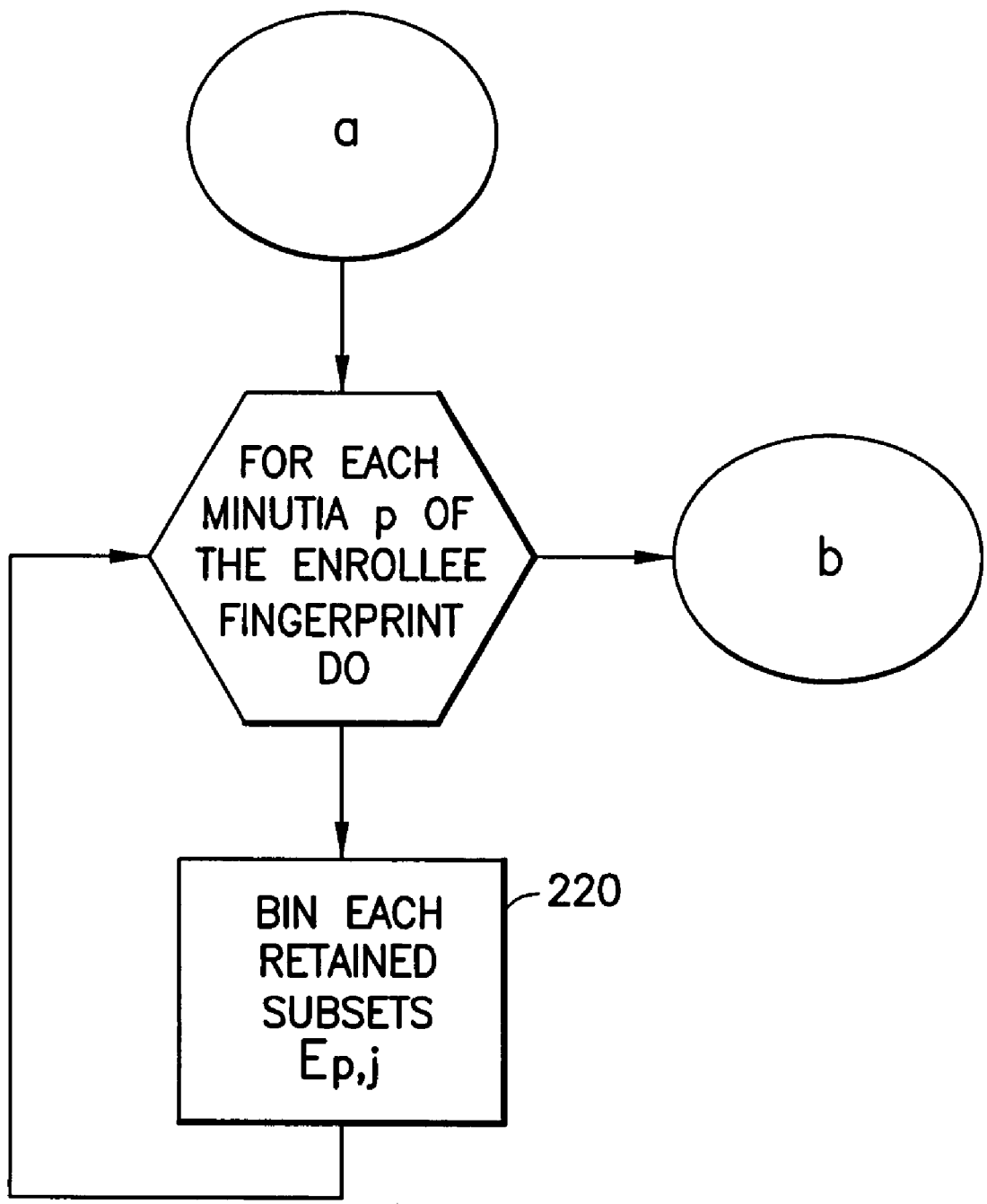
Figure 2C:
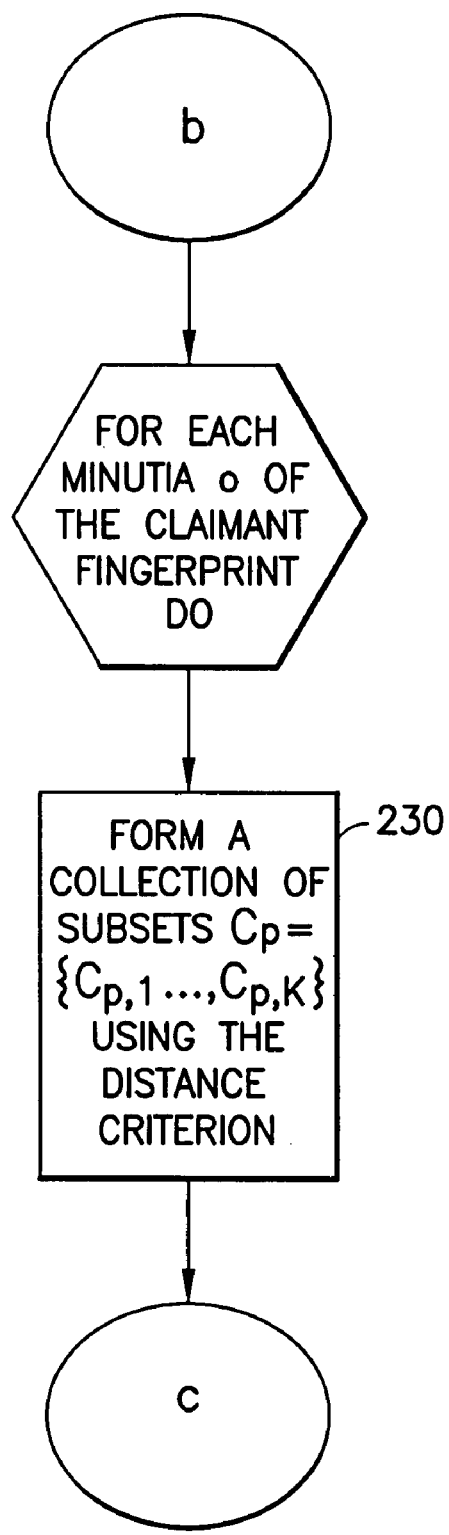
Figure 2D:
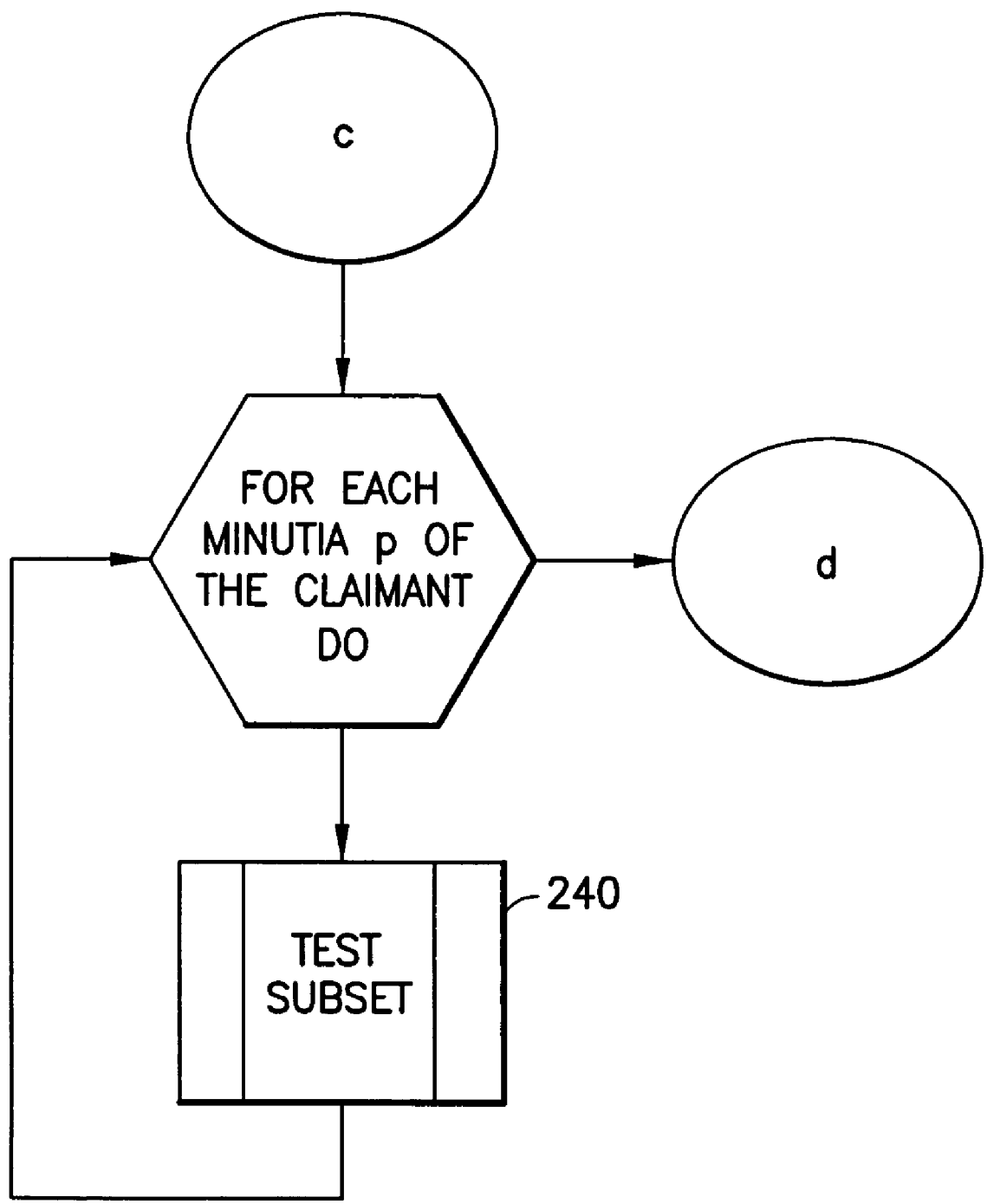
Figure 2E:
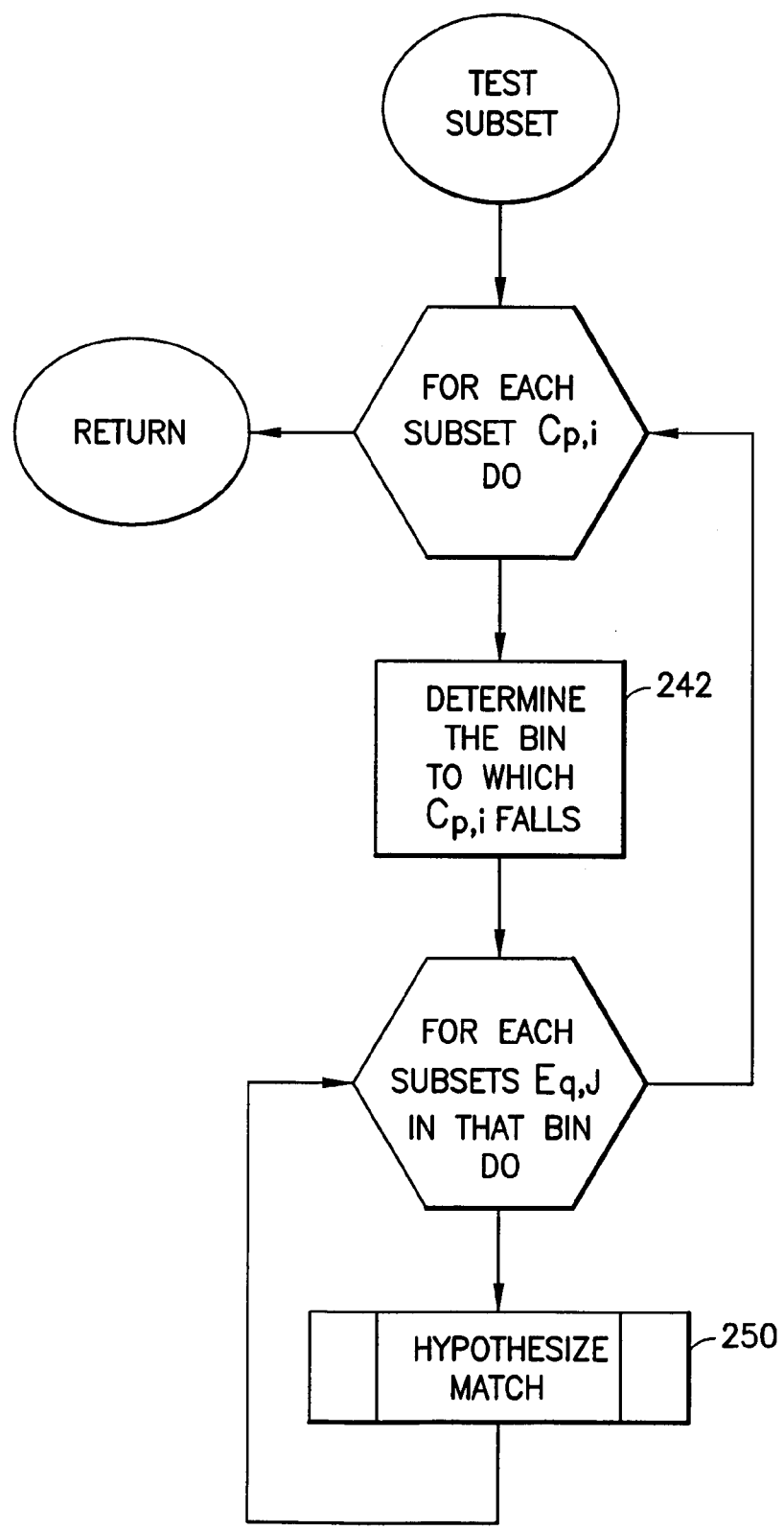
Figure 2F:
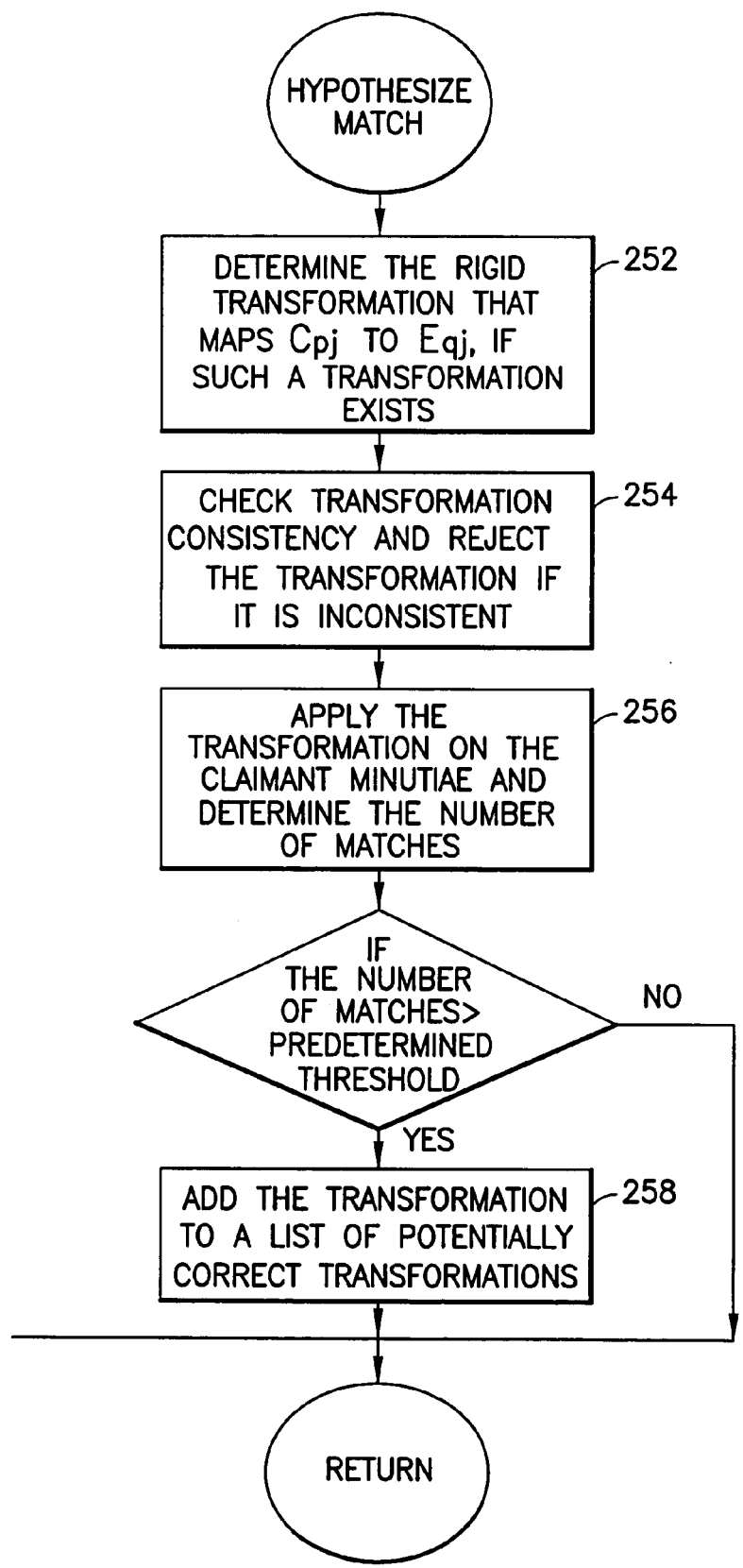

An embodiment of the invention is described in relation to fingerprint verification using a number of measures which provide relative advantages in the speed and/or accuracy of verification. Prior to describing the details of the embodiment, some background information assisting that description is first provided.

Model Alignment

Model alignment is a basic matching technique used in model-based recognition applications. Given a model and a scene, both represented by point sets in Euclidean space, the problem of model-based recognition is to find an occurrence of the model in the scene. The alignment technique solves this problem when the model and its occurrence in the scene are related by an affine transformation. The alignment technique determines whether there is an affine mapping that maps a large subset of points in the model to a subset of points in the scene. When such a transformation exists, alignment returns the transformation and the point-to-point correspondences. A known algorithm used for model-based recognition when the class of transformations is restricted to rigid transformations is described in S. Irani and P. Raghavan, *Combinatorial and Experimental Results for Randomized Point Matching Algorithms*, Proceedings of the ACM Conference on Computational Geometry, pp. 68–77, 1996.

Problem Formulation

The problem of matching two fingerprints can, in the context of a model alignment approaching be conceived as that of matching their respective feature sets. It is assumed that a fingerprint is represented as a feature set that consists of a set of minutiae and their attributes in the form of geometrical coordinates, ridge angle, and ridge counts. Since the features that are of interest are points on a plane with certain attributes, the problem reduces to that of matching attributed point sets in a plane. In other words, the model is the claimant fingerprint's feature set and the scene is the enrollee fingerprint's feature set and it is determined whether the model matches with the scene. It is assumed that the permissible transformations are rigid transformations (rotation combined with translation) and local elastic deformations.

A straight-forward application of the alignment technique does not solve the problem of fast and accurate fingerprint matching because of problems related to accuracy and speed. The notion of point-point match is redefined to address the problems caused by local non-linear elastic distortions, sensory uncertainty, and delocalization of minutiae during feature extraction. When the area common to two fingerprints varies significantly with prints, it is impossible to come up with a simple criterion for decision-making solely based on the number of point-point matches. The worst-case running time of the previously described alignment algorithm is $O(m^3 n^2 \log n)$, and the worst-case behaviour occurs whenever the two feature sets do not match. The high complexity of the algorithm renders itself useless for online applications.

Notation

Let p be a minutia. The coordinates of p are given by $p.x$ and $p.y$ and the ridge angle is given by $p.\theta$. The ridge count of two minutiae $p_1, p_2$ is denoted by $R(p_1, p_2)$. The Euclidean distance between two minutiae $p_1, p_2$ is denoted by $D(p_1, p_2)$. If T is a transformation, $T(p)$ denotes the point to which p is mapped by T. If P is a set, $|P|$ denotes the size of the set and if a is a number, $|a|$ denotes the absolute value of a. Let $\lfloor i \rfloor$ denote the largest integer not greater than i.

Alignment Algorithm

In the algorithm below, alpha is a positive constant in the range (0,1). The algorithm hypothesises a match between a pair of points $(p_1, p_2)$ in set P with a pair of points $(q_1, q_2)$ and computes the transformation T that takes the pair $(p_1, p_2)$ to the pair $(q_1, q_2)$, i.e, $T(p_1)=q_1$ and $T(p_2)=q_2$. The transformation T is then applied on the remaining points of the set P.

If a point p belonging to P is mapped to a point q in Q by T, i.e., if $T(p)=q$ then p is said to match with q. The number of such matches is counted. If this number exceeds a threshold, the algorithm declares that P and Q match. Otherwise, the process is repeated with every possible pair of points in P and Q. Instead of a pair of points a plurality of points could be used in the above algorithm.

A straight forward application of the alignment technique (as above) does not result in relatively fast and accurate fingerprint matching, because of problems related to accuracy and speed of the verification process. The notion of a point-point match is redefined to address the problems caused by local non-linear elastic distortions, sensory uncertainty, and delocalization of minutiae during feature extraction. When the area common to two fingerprints varies significantly with prints, it is impossible to come up with a simple criterion for decision-making solely based on the number of point-point matches. The worst-case running time of the algorithm described above is $O(m^3 n^2 \log n)$ and the worst-case behaviour occurs whenever the two feature sets do not match. The high complexity of the algorithm makes it unsuitable for on-line applications requiring speed and accuracy.

Pseudo-Code for Alignment Algorithm

A pseudo-code version of the alignment algorithm is given directly below.

```
Given: Two point sets P and Q with |P| = m and |Q| = n.
for each pair of points (p1, p2) in P
{
    for each pair of points (q1, q2) in Q
    {
        find the transformations T1 and T2 that map (p1,
        p2) to (q1, q2) and (p1, p2) to (q2, q1)
        respectively.
        for i = 1 to 2
        {
            Apply Ti on P.
                Determine how many points of
                Ti (P) match with the points in
                Q.
                If there are at least* alpha m
                matches declare that P matches
                with Q and return Ti.
        }
    }
}
```

Embodiment Verification Technique

An embodiment of the invention is now described with respect to a general verification technique which attempts to address limitations of prior art techniques in relation to the speed and accuracy of verification. FIG. 1 outlines the steps of an algorithm according to an embodiment of the invention.

Initially, in step 110, minutiae which are near the boundary of their fingerprint are eliminated from further consideration. In step 120, minutiae are sampled into subsets, in some cases pairs, based on their geometrical proximity. All the members of each subset are ordered by an appropriate ranking criteria which is indicative of a correspondence between the minutiae of different fingerprints, in step 130. The subsets are classified into one of a number of classification bins, in step 140. The bins discriminate between subsets based on the members of the subsets, and their associated properties: a number of different schemes are possible.

In step 150, the potential search space of proposed transformations matching claimant and enrollee fingerprints is pruned by eliminating inconsistent transformations. In step 160, those proposed transformations that are found are checked for mutual consistency. The topological correspondence of subsets is then checked for self-consistent proposed transformations, in step 170. As a result of the above analysis, a score is computed in step 180 that is indicative of the correspondence between fingerprints, based on the consistency of proposed transformations, and their degree of topological correspondence. On the basis of this score, it is decided whether the claimant and enrollee fingerprints match, if the calculated score exceeds a predetermined minimum value.

The algorithm hypothesises a match between, in the preferred embodiment, a pair of minutiae ($p_1$, $p_2$) in set P with a pair of minutiae ($q_1$, $q_2$) and computes the transformation T that takes the pair ($p_1$, $p_2$) to the close vicinity of pair ($q_1$, $q_2$). Of course, embodiments of the invention are not restricted to use with only pairs of minutiae but arbitrary groups of minutiae organised into subsets of the minutiae of a claimant or enrollee fingerprint.

Instead of computing a transformation for every pair of minutiae in P and every pair of minutiae in Q (which is computationally intensive), the number of combinations is restricted. The number of potential pairs of minutiae is restricted by taking into consideration only those minutiae pairs whose separation (that is, the distance between the two minutia of the pair) is within a range ($d_{min}$, $d_{max}$). In the preferred embodiment, $d_{min}$ is 50 and $d_{max}$ is 150. The advantage of this pruning of minutiae pairs based on distances is that it reduces the number of transformations to be computed and tested, and accordingly results in significant improvement in verification speed.

In the beginning of the verification process, each pair of minutiae belonging to the enrollee fingerprint is put into a bin based on the distance between the two minutiae constituting the pair. If the pair does not satisfy the distance criterion described previously then it is discarded from further computation.

Every pair of minutiae belonging to the claimant fingerprint that satisfies the distance criterion is a potential candidate for further processing. Based on the distance, the bin classification for this pair of minutiae is determined. The bin number is used to retrieve all enrollee pairs previously classified in that bin. These pairs have nearly the same separation as the candidate claimant pair. For each such retrieved pair, the transformation T taking the claimant pair to the enrollee pair is determined. The transformation T has two components: a rotation component β and a translation component (x, y).

If the difference between the ridge count of the claimant minutiae pair and the ridge count of the enrollee minutiae pair is not within a specified threshold the transformation is rejected. Otherwise, a sanity check is performed where it is checked whether the ridge through each minutia of the claimant pair is rotated by nearly the same amount.

If the claimant pair and the enrollee pair clear the above tests, then the transformation T is applied on each minutia of the claimant fingerprint and the corresponding matching minutia belonging to the enrollee fingerprint is determined if it exists. The number of matching minutiae is determined. A list of the top few transformations is maintained. If the number of matches obtained by the current transformation is more than any of the transformations in this list, the transformation is included in the list and the Kth best entry is removed.

The above procedure is repeated. The list of transformations contains the top K transformations discovered by the procedure. The consistency between these transformations is computed. The consistency checking routine gives a score based on the number of mutually consistent transformations. If the score is below a threshold, no match is declared. Otherwise, for each of the top K transformations, it is checked whether the attributes of the matched minutiae also match. Based on the degree of attribute matches a match score is computed. If the match score is above a threshold a match is declared otherwise no match is declared.

The embodiment algorithm described above incorporates various other features, each of which is described below in turn. A pseudo-code representation of the embodiment algorithm incorporating these features is then provided.

Speed

The simple "alignment" algorithm outlined above is relatively slow since it performs an exhaustive search of the transformation space defined by minutiae pair correspondences. For online applications, the high complexity of this algorithm is simply unacceptable. It is now described with reference to the deterministic sampling and transformation elimination steps below how the time complexity of the algorithm can be reduced by applying these techniques, while improving, maintaining or only nominally sacrificing the accuracy of the resulting procedure.

Sampling Based on Geometrical Nearness

It is recognised that the verification algorithm can be made faster without sacrificing accuracy by selectively sampling pairs of minutiae based on their geometrical proximity. Instead of using every pair of minutiae only those minutiae pairs whose separation falls in a predefined range [$d_{min}$, $d_{max}$] are used. Typically $d_{min}$ is 50 and $d_{max}$ is 150.

If a fingerprint image has N minutiae, then there are N(N−1)/2 pairs of minutiae that can be formed. If it is supposed that a claimant fingerprint has m minutiae and a potential enrollee fingerprint has n minutiae, then the number of candidate transformations that need to be tested is m.n.(m−1).(n−1)/2.

Typically, m and n are in the range [30–60], though can be as high as 100 in, for example, legacy fingerprints like those in NIST databases (standard fingerprint databases published by the United States National Institute of Standards and Technology). The number of candidate transformations to be tested can accordingly be of the order of several hundred thousands to millions which is prohibitively large for online applications.

The rationale of this scheme is this as follows. Let p be a minutia in the claimant fingerprint and let p' be the minutia corresponding to p in the enrollee fingerprint (assuming that the claimant fingerprint is actually a match of the enrollee fingerprint). Since the area common to the two fingerprints is typically small, it is very likely that only the minutiae which are geometrically close to p will be reproduced in the enrollee fingerprint. So if q is a minutia (in the claimant fingerprint) that is very far from p, then the pairs (p, q) and (q, p) are not likely to help us in finding the correct geometric transformation between the claimant fingerprint and the enrollee fingerprint. Pairs of minutiae that are very close to each other are not used for competing proposed transformations between enrollee and claimant fingerprints, as such transformations are likely to be very sensitive to sensor measurement errors (that is, reflected in calculated distance and ridge count). Accordingly the transformation obtained by such pairs is not reliable.

The above discussion suggests that a minutia is paired only with those minutiae which are at a distance in a predefined range [$d_{min}$, $d_{max}$] from it. Thus, for each minutia, the minutiae that are paired with it are the ones which are geometrically close to it. This alone reduces the number of candidate transformations from m.n.(m−1).(n−1)/2 to $c^2$.m.n where c is typically smaller than 10.

Elimination of Boundary Minutiae

Further reduction in the number of candidate transformations is possible if minutiae that are on or near the boundary of the fingerprint are discarded from analysis.

For each minutia, it can be checked whether it is close to the boundary of the fingerprint. If so, it is not used for forming pairs. One way to perform this check is by determining the foreground and background of the image. The image is divided into multiple blocks, and each block is tagged either as a foreground block or a background block. If a minutia has a background block in near vicinity, then it must be close to the border. Separation of background from foreground is typically done by all feature extractors. So, this process does not incur additional computations. If the feature extractor does not provide appropriate foreground-background classification of image blocks, then an approximate technique for finding the boundary based solely on minutiae data can be used, as later described.

Early Elimination of Inconsistent Transformations

The attributes of minutiae (distance, ridge count, ridge angle) can be effectively used to prune the search space, predominantly to improve speed of execution, as well as to make the matching more accurate. Tests are performed using these attributes to eliminate inconsistent transformations.

In this respect, it is assumed the two minutiae set are related (approximately) by a rigid transformation and compensated for elastic deformations by considering a tolerance box around each minutiae. In this respect, let p and q be two points on a plane. It is said that p matches with q under a rigid transformation T, if T takes p to a point which is in the close vicinity of q. More precisely, p matches with q under transformation T if $D(T(p), q) <= \Delta_D$, where $\Delta_D$ is a small positive constant. Such a notion of point-point matching is appropriate because of the inherent uncertainty associated with the geometric coordinates of minutiae. Local elastic deformations can be compensated by choosing $\Delta_D$ appropriately.

(i) Distance

Let $(p_1, p_2)$ be a pair of minutiae in the claimant fingerprint and $(q_1, q_2)$ be a pair in the enrollee fingerprint. When $D(p_1, p_2)$ and $D(q_1, q_2)$ differ significantly no rigid transformation T can map $p_1$ to $q_1$ and $p_2$ to $q_2$ such that (a) $D(T(p_1), q_1) <= \Delta_D$ and (b) $D(T(p_2), q_2) <= \Delta_D$.

Hence, it is recognised that verification can be computationally expedited by only computing the transformation and exploring it further when:

$$|D(p_1,p_2) - D(q_1,q_2)| <= 2 * \Delta_D.$$

Here, $\Delta_D$ is a small positive constant.

(ii) Ridge Count

If the pair $(p_1, p_2)$ indeed matches with the pair $(q_1, q_2)$ then the corresponding ridge counts must be nearly the same. Therefore, it is checked whether:

$$|R(p_1,p_2) - R(q_1,q_2)| <= \Delta_R$$

Here, $\Delta_R$ is a two small positive constant.

(iii) Ridge Angle

Let β be the rotational component of the transformation T mapping $(p_1, p_2)$ to $(q_1, q_2)$. It is checked whether the ridge through each minutia is rotated by roughly the same amount:

(a) $(|p_1.\theta + \beta - q_1.\theta| <= \Delta_\theta)$
(b) $(|p_2.\theta + \beta - q_2.\theta| <= \Delta_\theta)$.

Here, $\Delta_\theta$ is a small positive constant.

Accuracy

Once a transformation T is found by hypothesising a correspondence between $(p_1, p_2)$ and $(q_1, q_2)$, T is applied on each minutia in the claimant fingerprint and the corresponding matching minutia of the enrollee fingerprint is determined if it exists. The result is a correspondence between a subset of the minutiae P' of the claimant fingerprint and a subset of the minutiae Q' of the enrollee fingerprint.

Transformation Consistency Checking

A simple accept/reject strategy based on the number of point-point matches (such as that outlined above, based on x) very often results in false acceptances and false rejects especially when the number of minutiae is small. This is because, in many matching fingerprints the number of matching minutiae is small and accidental point-point matches are also possible in non-matching fingerprints.

To counter this problem, a transformation consistency checking scheme is adopted in which the top K transformations (K can be conveniently taken as 10) is determined in terms of the number of point-point matches and checking the consistency among these transformations.

A rigid transformation T can be represented as a triplet (x, y, β), where x and y are the translation along the X and Y axis respectively, and β is the rotation. Two transformations $T_1 = (x_1, y_1, \beta_1)$ and $T_2 = (x_2, y_2, \beta_2)$ are consistent if:

1. $|x_1 - x_2| <= \Delta_x$,
2. $|y_1 - y_2| <= \Delta_y$, and
3. $|\beta_1 - \beta_2| <= \Delta_\beta$.

In the expressions above, $\Delta_x$, $\Delta_y$, and $\Delta_\beta$ are small positive constants. In the case of matching fingerprints, a majority of these transformations are mutually consistent while for non-matching fingerprints they are not.

Transformation Attribute Matching

A transformation establishes a correspondence between a subset P' of minutiae in the claimant fingerprint and a subset Q' of minutiae in the enrollee fingerprint.

This correspondence is a geometrical correspondence. It needs to be further verified for topological correspondence. The attributes of the minutiae are used for this purpose. It is checked whether the attributes of the two minutiae sets match. It is first checked how many of the ridge counts match and then how many ridge angles match, using positive constants as threshold tolerance values.

Decision Making

When the fraction of mutually consistent transformations is significant measures of the topological correspondence are generated to evaluate the correspondence defined by each such transformation. A score is then computed taking into account the percentage of point-point matches, the fraction of mutually consistent transformations, and the scores for each of the top transformations. The scoring routine computes this score which is used to decide whether the claimant fingerprint matches with the enrollee fingerprint or not.

General Algorithm

A generalised algorithm incorporating the features noted above is set out below in terms of a number of steps which are performed in analysing whether a match exists between a claimant fingerprint and one of the enrollee fingerprints. FIGS. 2A to 2G provide a corresponding description of the steps which occur in the execution of this algorithm.

FIG. 1, referred to above, illustrates a flowchart representing steps that are performed in an embodiment verification scheme Corresponding heading in the description below approximately matches with the actual steps depicted in FIG. 1.

Step 110

Let $x_1 \ldots x_m$ be the x coordinates and $y_1 \ldots y_m$ be they coordinates of the minutiae. Let $x_{min}$ and $x_{max}$ denote the smallest and highest among $x_1 \ldots x_m$. Similarly, let $y_{min}$ and $y_{max}$ denote the smallest and highest among $y_1 \ldots y_m$. Let RECT($x_{min}$, $x_{max}$, $y_{min}$, $y_{max}$) be the rectangle formed by the points ($x_{min}$, $y_{min}$), ($x_{min}$, $y_{max}$), ($x_{max}$, $y_{min}$), ($x_{max}$, $y_{max}$). A minutia with coordinates (x,y) is deemed close to the fingerprint boundary if its distance from any side of RECT ($x_{min}$, $x_{max}$, $y_{min}$, $y_{max}$) is less than $d_{max}$. Accordingly, the following test can be used for appropriate elimination of "boundary" minutiae:

if ($|x-x_{min}|<d_{max}$) or ($|x-x_{max}|<d_{max}$) or ($|y-y_{min}|<d_{max}$) or ($|y-y_{max}|$) then discard the minutia.
else retain the minutia.

When the fingerprint is of poor quality, using RECT($x_{min}$, $x_{max}$, $y_{min}$, $y_{max}$) to determine the minutiae near the fingerprint boundary can be prone to errors. Instead, RECT($x_{K-min}$, $x_{K-max}$, $y_{K-min}$, $y_{K-max}$) can be used where $x_{K-min}$ and $x_{K-max}$ are the Kth smallest and Kth largest of $x_1 \ldots x_m$ respectively. Similarly, $y_{K-min}$ and $y_{K-max}$ are the Kth smallest and Kth largest of $y_1 \ldots y_m$ respectively. This technique is more robust in the presence of false minutiae.

Step 120

For each minutia p of the enrollee fingerprint, a collection of subsets $E_P = \{E_{p,1}, E_{p,2}, \ldots, E_{p,K}\}$ is formed in step 210. Here, each $E_{p,i}$ is a subset of minutiae that are geometrically close to the minutia p, satisfying a distance criterion. Each minutia in $E_{p,i}$ (other than p itself) is at a distance in the range $[d_{min}, d_{max}]$ from p.

Step 130

The minutiae in $E_{p,i}$ could be either unordered or ordered based on some criterion. Typical ordering criteria are:

1. A minutia is ordered based on its distance from p. In which case, p gets a rank 0. The minutia that is closest to p gets a rank 1, the next closest minutia gets a rank 2 and so on.
2. A minutia is ordered based on the orientation of its ridge with respect to the orientation of the ridge at p. This difference in ridge orientations is termed ridge-orientation separation. A minutia gets a rank based on its ridge-orientation separation. Thus p gets rank 0. The minutia with the next smallest ridge-orientation separation gets the rank 1 and so on.
3. A minutia q is ordered based on the ridge count R(p,q). Thus p gets rank 0. The minutia with the next smallest ridge count (with respect top) gets rank 1 and so on.
4. Consider the coordinate system formed as follows. Let p be the origin and the x-axis be along the ridge at p. In this coordinate system, the projection of each minutia q in $E_{p,i}$ is computed on the x-axis. Let q' be q projected on the x-axis. A minutia q in $E_{p,i}$ is ranked based on the distance of its projection q' from the origin.

In each of the above methods of ordering minutiae, various other orders can be formed and used by permutating the ranks.

Step 140

Bin each set $E_{p,i}$ based on the 'diameter' of the set in step 220. The diameter of a set of points means the greatest point-point separation among pairs of points in the set. Binning based on other criteria is also possible:

A. Bin based on the largest/smallest/median ridge count between pairs of minutiae in $E_{p,i}$ (more generally the Kth largest ridge count or some statistic, such as average).
B. Bin based on the largest/smallest/median ridge count between p and minutiae in $E_{p,i}$ (more generally the Kth largest ridge count or some statistic, such as average).
C. Bin based on the largest/smallest/median separation of the minutiae in $E_{p,i}$ from p (more generally the Kth largest separation or some statistic, such as average).
D. Bin based on the largest/smallest/median ridge-orientation separation (with respect to p) of minutiae in $E_{p,i}$ (more generally the Kth largest ridge-orientation separation or some statistic, such as average).
E. Consider the coordinate system formed as follows. Let p be the origin and the x-axis be along the ridge at p. In this coordinate system, the projection of each minutia q in $E_{p,i}$ is computed on the x-axis. Let q' be q projected on the x-axis. Bin $E_{p,i}$ based on the largest/smallest/median distance of the projections of its minutiae from the origin (more generally the Kth largest projection or some statistic, such as average).

The technique described above is applied to the claimant fingerprint as well. That is, for each minutia p of the claimant fingerprint, a collection of subsets is formed in step 230 where $C_P = \{C_{p,1}, C_{p,2}, \ldots, C_{p,K}\}$.

Step 150

A testing step 240 is now performed, as outlined below. For each subset, it is determined, in step 242, to which bin each subset belongs. For each binned subset, a match is hypothesized in step 250. This involves determining a rigid transformation in step 252 that transforms a subset to its corresponding match in the enrollee feature set. The transformation consistency is checked in step 254 and, if consistent, the transformation is applied to claimant minutiae to determine the number of matches, in step 256. If the number of matches exceeds a predetermined threshold, it is added to a list of potentially correct transformations, in step 258.

```
for each minutia p in the claimant fingerprint do {
    for each subset C_{p,i} corresponding to p do
    {
        determine the bin to which C_{p,i} falls.
        for each subset E_{q,j} in that bin do
        {
            determine the rigid transformation that maps C_{p,i} to
            E_{q,j}, if such a transformation exists.
            check transformation consistency and reject the
            transformation if it is inconsistent.
            if the transformation is consistent then apply the
            transformation on the claimant minutiae and determine
            the number of matches (and/or the degree of
            topological correspondence using attributes of the
            minutiae).
            if the number of matches (and/or the degree of
            topological correspondence using attributes of the
            minutiae) is above a predetermined threshold then add
            the transformation to a list of potentially correct
            transformations.
        }
    }
}
```

Steps 160, 170 and 180

Having completed hypothesis matching in step 250, a consistency score is computed in step 260. For each transformations shortlisted in step 258 having a consistency score above a predetermined threshold, the number of matches and topological correspondence is determined in step 270.

On this basis, a matching score is calculated for each of the transformations shortlisted in step 258. This matching score is used to declare a match in step 290 if this measure is above a predetermined threshold. Otherwise a failed match is declared in step 292.

```
compute the transformation consistency score
if the transformation consistency score is above a
predetermined threshold then for each of the
transformations T in the most promising transformation
   set do
   {
       apply T on the claimant minutiae.
           determine the degree of topological
           correspondence using attributes of the minutiae)
   }
   compute a match score using the topological
   correspondence and the number of consistent
   transformations. If the score is above a predetermined
   threshold then declare that claimant matches with
   enrollee.
else
reject the claim.
```

Pseudo-Code for Embodiment Algorithm

To more fully illustrate the embodiment of the verification process discussed more particularly above, a pseudo-code implementation of a corresponding algorithm is given directly below.

```
Given: Two minutiae sets P and Q with |P| = m and |Q| = n.
for each pair (q₁,q₂) in Q
{
    if (d_min <= D(q₁, q₂) <= d_max)
    {
        Put (q₁, q₂) to the bin floor(N*D(q₁, q₂)/(d_max −
            d_min)).
    }
}
for each pair p₁, p₂ in P
{
    if (d_min <= D(p₁, p₂) <= d_max)
    {
        Let i = floor(N*D(p₁, p₂)/(d_max − d_min).
        for each pair (q₁,q₂) in the i th bin
        {
                        find the transformation T
                        taking (p₁,p₂) to (q₁, q₂).
                        Let β be the rotation
                        component of T.
                        if ((|R(p₁,p₂) − R(q₁,q₂) | <=
                            Δ_R)
                        and (|p₁.θ + β− q₁.θ| <= Δ_θ)
                        and (|p₂.θ + β− q₂.θ| <= Δ_θ)
            {
                P' = Q' = { };
                j = 0;
                Apply T on P.
                for each minutia p in P
                {
                                if there is an
                                unmarked minutia q in Q
                                such that D(T_i(p), q) <=
                                    Δ_D
                    {
                        P' [j] = p
                        Q' [j] = q
                        Mark q
                        j = j + 1
                    }
                }
                                Let S_K be the Kth top score
                                so far.
                                if (|P'| > S_K)
                                {
                                    replace S_K and the
                                    corresponding
                                    transformation by |P'|
                                    and T.
                                }
            }
        }
    }
}
score = 0;
Let τ denote the set of top K transformations.
conscr = CONSISTENCY(τ);
if (conscr > MIN_CONSISTENCY)
{
    for each of the top K transformations T_i
    {
        Let P_i' subset P and Q_i' subset Q be the
        matching minutiae sets under T_i.
        (rcount[i], acount[i]) = ATTRIBUTE_MATCH(P_i',
        Q_i');
    }
    score = SCORE( );
}
if (score > MIN_SCORE)
{
    Declare that P and Q match.
}
else
{
    Declare that P and Q do not match.
}
CONSISTENCY( )
```

This routine is based on the tests outlined in the "Transformation consistency checking" heading above.

```
for each of the top few transformations τ in the list of
potentially correct transformations do
{
    Determine the number of transformations (among the top
    few transformations in the list of potentially
    correct transformations) which are consistent with τ.
    Let this number be MC(T).
}
Determine the largest MC(T) (let this be MC_mac) and return
this as the consistency score and τ and the transformations
consistent with τ as the most promising transformation set.
ATTRIBUTE_MATCH( )
```

The attribute matching routine determines a measure of the topological correspondence between the identified subsets of the claimant and enrollee fingerprints.

```
Given: Two minutiae sets P' and Q' with |P| = |Q| = m'.
Let β be the rotational component of the transformation
mapping P' to Q'.
rcount = acount = 0;
for each pair of minutiae (p₁, p₂) in P'
{
    Let (q₁, q₂) be the pair matching with (p₁, p₂) in Q'.
    if (|R(p₁,p₂) − R(q₁,q₂) | <= Δ_R)
    {
        rcount = rcount + 1;
    }
}
for each minutia p in P'
{
    Let q in Q' be the minutia matching with p.
    if (|p.θ + β − q.θ| <= Δ_θ)
```

-continued

```
    {
        acount = acount + 1;
    }
}
```

In the above algorithm $\Delta_R$ and $\Delta_\theta$ are small positive constants. The counts computed by ATTRIBUTE_MATCH ( ) are normalised to take a value between 0 and 1.

SCORE( )

For each of the transformations τ in the most promising transformation set, rcount[T] and acount[T] are known. The transformation consistency score MC is also known. Let $rcount_{median}$ and $acount_{median}$ be the median of rcounts and acounts.

$$match\_score = a_1 * MC_{mac} + a_2 * rcount_{median} + a_3 * acount_{median}$$

Instead of median use Kth maximum or average for rcount and acount can also be used.

Experimental Results

Two measures that are important while evaluating a fingerprint verification scheme are accuracy and speed. Accuracy of a verification scheme is measured in terms of its false accept rate (FAR) and false reject rate (FRR). False acceptance is a situation where the verification scheme declares two non-matching fingerprints as matching fingerprints and false reject occurs when the verification scheme declares two matching fingerprints as non-matching fingerprints. Set out directly below in Table 1 are experimental error rates indicative of the results which can be achieved using embodiments of the invention.

TABLE 1

| Database | FRR | FAR |
|---|---|---|
| 1 | 1.33% | 0.00% |
|  | (4/300) | (0/19200) |
| 2 | 26.11% | 0.00% |
|  | (235/900) | (0/11683) |
|  | 19.56% | 0.03% |
|  | (176/900) | (3/11683) |
|  | 14.44% | 0.23% |
|  | (130/900) | (27/11683) |
| 3 | 5.56% | 0.00% |
|  | (28/306) | (0/10176) |
|  | 4.25% | 0.15% |
|  | (13/306) | (15/10176) |

Speed in terms of the throughput of the verification system, i.e., the number of fingerprints it can verify per second. Set out directly below in Table 2 are experimental throughput rates.

TABLE 2

| Database | Non-Matching | Matching |
|---|---|---|
| 1 | 27 | 19 |
| 2 | 1.5 | 1.1 |
| 3 | 15 | 7 |

In the results above, each of databases 1 to 3 contains different images as now explained.

1. Database 1 consistes of a set of images (each of size 291×525) scanned by an optical fingerprint reader. There are 300 matching pairs and 19200 non-matching pairs.
2. Database 2 consistes of a set of images (each of size 572×480) chosen randomly from the NIST 9 database. There are 900 matching pairs and 11683 non-matching pairs.
3. Database 3 consistes of a set of images (each of size 508×480) scanned by a cheaper optical fingerprint reader. There are 1920 matching pairs and 10176 non-matching pairs.

The minutiae are generated using an in-house feature extractor. The first mentioned table gives the error rates and second mentioned table gives the throughput for the three databases.

The images in Database 1 and Database 3 had small to reasonable amount of elastic distortions. The images in Database 1 are in general of better quality than those in Database 3. Translation and rotation are significant (about 100–200 pixels and 10–30 degrees respectively) in many of the images. The images in Database 1 had about 30–40 minutiae each on an average while those in Database 3 had about 40–60 minutiae.

Database 2 is significantly different from the other two databases. The images in this database are of poor quality with a significant amount of non-recoverable regions. In fact, for many mated pairs it would be difficult for a human expert to certify that they actually match. As a consequence of the poor quality of the images, the number of minutiae reported for these images was high (about 130) and presumably a significant fraction of these are false minutiae.

In all the three databases, the fingerprints on which the algorithm failed had either a large number of spurious minutiae or a large amount of elastic distortion. The difference in the matching speed for matching and non-matching fingerprints is because of the early elimination of inconsistent transformations. In case of non-matching fingerprints most of the transformations are inconsistent and are not explored further. In experiments $\Delta_D$ was in the range 5–8, $\Delta_R$ in 2–3, $\Delta_\theta$ in 5–10, $d_{min}$ in 50–100, $d_{max}$ in 100–200, $\Delta_X$ in 5–25, $\Delta_Y$ in 5–25 and $\Delta_\beta$ in 5–10.

Hardware Implementation

Figure 3:
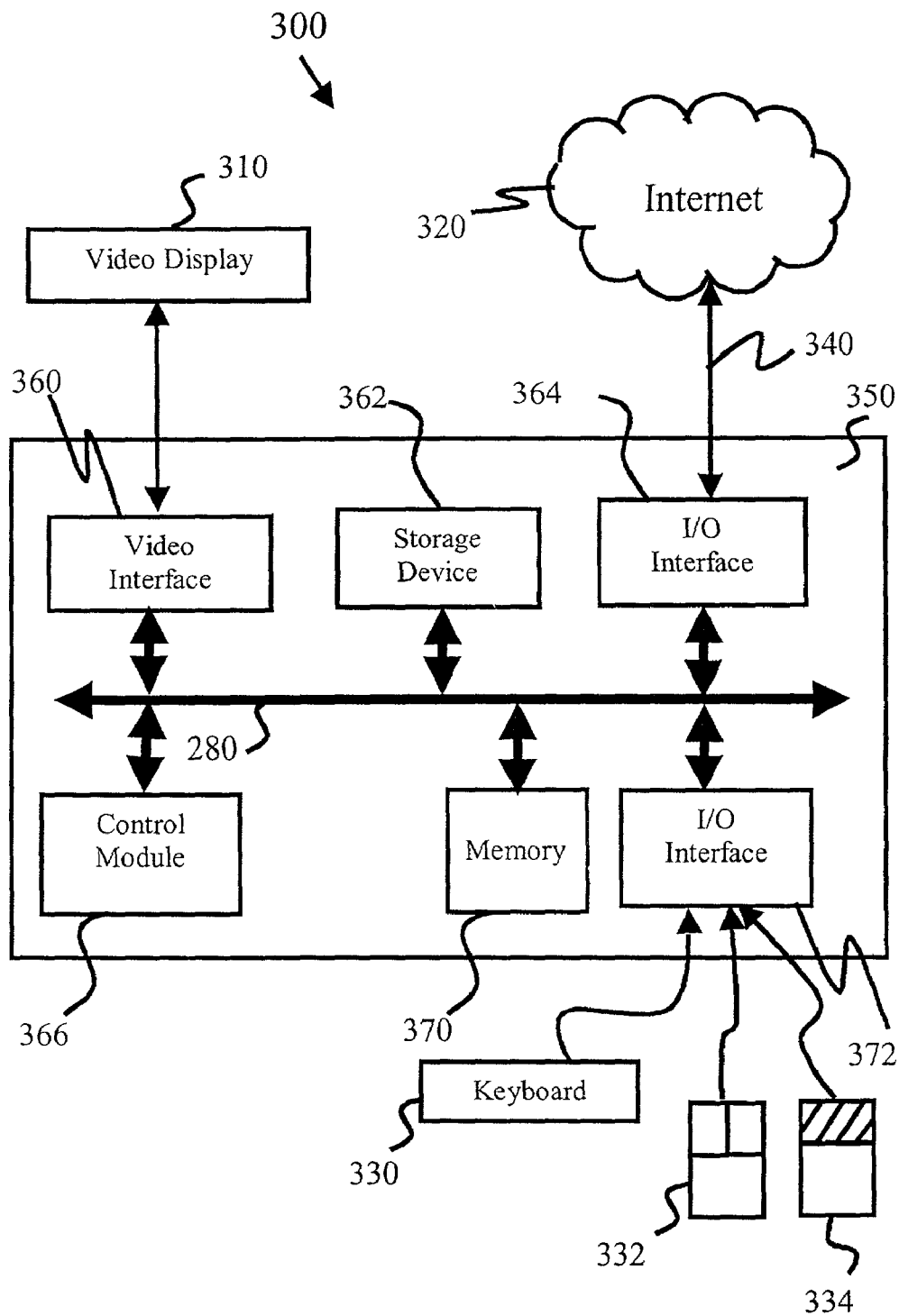
FIG. 3 is a schematic diagram of a computing system involved in performing the embodiment fingerprint verification of FIG. 1.

The described process of classification can be implemented using a computer program product in conjunction with a computer system 300 as shown in FIG. 3. In particular, the process can be implemented as software, or computer readable program code, executing on the computer system 300.

The computer system 300 includes a computer 350, a video display 310, and input devices 330, 332. In addition, the computer system 300 can have any of a number of other output devices including line printers, laser printers, plotters, and other reproduction devices connected to the computer 350. In particular, the computer system 300 has a fingerprint scanning hardware 334 suitable for scanning the fingerprint of a claimant, so that real-time verification of the claimant's fingerprint can be performed by the computer system 300 running a computer program which executes instructions corresponding to an algorithm of an embodiment verification scheme described above.

The computer system 300 can be connected to one or more other computers via a communication input/output (I/O) interface 364 using an appropriate communication channel 340 such as a modem communications path, an electronic network, or the like. The network may include a local area network (LAN), a wide area network (WAN), an Intranet, and/or the Internet 320.

The computer 350 includes the control module 366, a memory 370 that may include random access memory (RAM) and read-only memory (ROM), input/output (I/O) interfaces 364, 372, a video interface 360, and one or more storage devices generally represented by the storage device 362. The control module 366 is implemented using a central processing unit (CPU) that executes or runs a computer readable program code that performs a particular function or related set of functions.

The video interface 360 is connected to the video display 310 and provides video signals from the computer 350 for display on the video display 310. User input to operate the computer 350 can be provided by one or more of the input devices 330, 332 via the I/O interface 372. For example, a user of the computer 350 can use a keyboard as I/O interface 330 and/or a pointing device such as a mouse as I/O interface 332. The keyboard and the mouse provide input to the computer 350. The storage device 362 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 350 is typically connected to other devices via a bus 380 that in turn can consist of data, address, and control buses.

The method steps outlined in relation to the embodiment verification algorithm are effected by instructions in the software that are carried out by the computer system 300. Again, the software may be implemented as one or more modules for implementing the method steps.

In particular, the software may be stored in a computer readable medium, including the storage device 362 or that is downloaded from a remote location via the interface 364 and communications channel 340 from the Internet 320 or another network location or site. The computer system 300 includes the computer readable medium having such software or program code recorded such that instructions of the software or the program code can be carried out. The computer system 300 communicates with a database, either internally via the storage means 362 or through communication interface 364, in which is stored enrollee fingerprints with which the scanned claimant fingerprint is compared.

The computer system 300 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 366. Intermediate storage of the program code and any data including entities, tickets, and the like may be accomplished using the memory 370, possibly in concert with the storage device 362.

In some instances, the program may be supplied to the user encoded on a CD-ROM or a floppy disk (both generally depicted by the storage device 362), or alternatively could be read by the user from the network via a modem device connected to the computer 350. Still further, the computer system 300 can load the software from other computer readable media. This may include magnetic tape, a ROM or integrated circuit, a magneto-optical disk, a radio or infra-red transmission channel between the computer and another device, a computer readable card such as a PCMCIA card, and the Internet 320 and Intranets including email transmissions and information recorded on Internet sites and the like. The foregoing are merely examples of relevant computer readable media. Other computer readable media may be practised without departing from the scope and spirit of the invention.

Further to the above, the described methods can be realised in a centralised fashion in one computer system 300, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

Described above is an algorithm, and means for performing that algorithm, that attempts to provide relatively fast and accurate fingerprint verification. This algorithm is able to handle arbitrary amounts of translation and rotation of fingerprints. Further, the algorithm's performance in the presence of noise and elastic deformation is relatively robust.

It is understood that the invention is not limited to the embodiment described, but that various alterations and modifications, as would be apparent to one skilled in the art, are included within the scope of the invention.

We claim:

1. A method of fingerprint verification suitable for determining whether a claimant is one of a number of enrollees, the method comprising:
    identifying minutiae of an enrollee fingerprint, and minutiae of a claimant fingerprint; analyzing the geometrical correspondence between minutiae of the claimant fingerprint and minutiae of the enrollee fingerprint via affine transformation;
    determining whether the claimant fingerprint and the enrollee fingerprint match on the basis of the analysis and selecting identified subsets of the enrollee minutiae and identified subsets of the claimant minutiae.
    wherein minutiae are eliminated from and/or not selected for inclusion in said identified subsets if the minutiae is determined to be positioned on or near the boundary of the claimant or enrollee fingerprint; and
    wherein a minutiae is determined to be positioned on or near the boundary of a fingerprint if it is less than a predetermined geometrical separation from any one of the sides of a rectangle defined by the co-ordinates of the most outlying minutiae of the fingerprint.

2. The method as claimed in claim 1, wherein minutiae which are selected for inclusion in said identified subsets if the geometrical separation between the minutiae and the index minutiae falls within a predetermined range between a finite minimum and a finite maximum.

3. The method as claimed in claim 1, wherein the minutiae which are members of said identified subsets are ranked according to a predetermined ordering criterion indicative of a possible correspondence between the minutiae of different identified subsets of the same of different fingerprints.

4. The method as claimed in claim 3, wherein said predetermined ordering criterion is increasing geometrical distance to respective minutiae from a particular index minutiae which is a member of said identified subset.

5. The method as claimed in claim 3, wherein said predetermined ordering criterion is increasing difference in rotational ridge orientation between respective minutiae and a particular index minutiae which is a member of said identified subset.

6. The method as claimed in claim 3, wherein said predetermined ordering criterion is increasing ridge count between respective minutiae and a particular index minutiae which is a member of said identified subset.

7. The method as claimed in claim 3, wherein said predetermined ordering criterion is an increasing distance between respective minutiae and an axis defined by the ridge angle of a particular index minutiae which is a member of said identified subset.

8. The method as claimed in claim 1, wherein said identified subsets are classified in one of a plurality of bins which are defined ante basis of a predetermined metric associated with or derived from properties relating to the minutiae which are members of said identified subsets.

9. The method as claimed in claim 8, wherein said predetermined metric is the largest geometrical separation between any pair of minutiae of an identified subset.

10. The method as claimed in claim 8, wherein said predetermined metric is based on the distribution of ridge counts between pairs of minutiae of an identified subset.

11. The method as claimed in claim 8, wherein said predetermined metric is based on the distribution of geometrical distances of the minutiae from the index minutiae.

12. The method as claimed in claim 8, wherein said predetermined metric is based on the distribution of ridge-orientation rotational distances of the minutiae from the index minutiae.

13. The method as claimed in claim 8, wherein said predetermined metric is based on the distribution of geometrical distances of the minutiae from an axis defined by the ridge angle of the index minutiae.

14. The method as claimed in claim 8, wherein said analysis is performed for identified claimant subsets and identified enrollee subsets which are classified in the same bin.

15. The method as claimed in claim 1, wherein said analysis further includes determining one or more proposed transformations that map one of the identified claimant subsets to one of the identified enrollee subsets, for respective identified subsets that meet a predetermined criterion.

16. The method as claimed in claim 15, wherein said predetermined criterion is geometrical separation, between the minutiae and the index minutiae, within a predetermined range between a finite minimum and a finite maximum.

17. The method as claimed in claim 15, wherein said predetermined criterion is a difference in the distance between the minutiae and the index minutiae below a predetermined distance threshold.

18. The method as claimed in claim 15, wherein said predetermined criterion is a difference in ridge counts below a predetermined number threshold.

19. The method as claimed in claim 15, wherein said predetermined criterion is, for either or both of the corresponding minutiae and the index minutiae a difference in ridge angle orientation below a predetermined angular threshold, after transformation.

20. The method as claimed in claim 1, wherein said analysis involves determining a plurality of proposed transformations proposed as matches between the claimant fingerprint and the enrollee fingerprint, in which the proposed transformations are each checked for consistency with each other.

21. The method as claimed in claim 20, wherein the proposed transformations comprise those transformations that map one of the identified claimant subsets to one of the identified enrollee subsets.

22. The method as claimed in claim 20, wherein the consistency checking involves determining differences in parameters of the respective transformations.

23. The method as claimed in claim 20, wherein two transformations are considered to be consistent with each other if the differences between transformation parameters of the two transformations are all below respective predetermined thresholds.

24. The method as claimed in claim 23, wherein the transformation parameters $(x, y, \beta)$ represent two parameters of translation $(x, y)$ and a parameter of rotation $(\beta)$.

25. The method as claimed in claim 21, wherein the proposed transformations which are checked for consistency are limited to a predetermined number of transformations which achieve the greatest correspondence between their respective identified claimant and enrollee subsets.

26. The method as claimed in claim 25, wherein the correspondence between respective identified subsets is assessed in terms of the number of minutiae from the respective identified subsets that are deemed to match within a predetermined tolerance.

27. The method as claimed in claim 25, wherein a mutually consistent subset of the proposed transformations is identified as a result of the consistency checking.

28. The method as claimed in claim 1, wherein said determining involves checking whether there is topological correspondence between selected identified claimant and enrollee subsets of minutiae.

29. The method as claimed in claim 28, wherein topological correspondence is determined by providing a ridge count metric calculated by incrementing a ridge count for each instance of matching pairs of minutiae in the respective identified claimant and enrollee subsets in which the difference in ridge counts is less than a predetermined threshold; and providing a ridge angle metric calculated by incrementing a ridge angle count for each instance of matching minutiae in the respective identified claimant and enrollee subsets in which the difference in ridge angle, taking into account the rotational component of the proposed transformation, is below a predetermined threshold.

30. The method as claimed in claim 1, wherein said determining involves calculating a score representative of the correspondence between a claimant fingerprint and the enrollee fingerprint for use in determining that the claimant fingerprint and the enrollee fingerprint match, if the scores exceed a predetermined minimum value.

31. The method as claimed in claim 30, wherein the score is determined based on one or more of the following factors:
the number of corresponding pairs of minutiae from respective identified subsets that have a difference in ridge counts below a predetermined number threshold;
the number of corresponding minutiae from respective identified subsets that have a difference in ridge angle orientation below a predetermined angular threshold, after affine transformation;
the proportion of minutiae which have corresponding minutiae in the other fingerprint; and
proportion of mutually consistent transformations.

32. The method as claimed in claim 31, wherein the score is calculated as a weighted average of values of any two or more of the factors.

33. A method of fingerprint verification suitable for determining whether a claimant is one of a number of enrollees, the method comprising:
identifying minutiae of an enrollee fingerprint, and minutiae of a claimant fingerprint;

selecting identified subsets of the enrollee minutiae and identified subsets of the claimant minutiae, in which each of the identified subsets has an associated index minutiae which is a member of that identified subset, and members of the identified subsets are selected on the basis of whether the geometrical separation between the minutiae and the index minutiae falls within a predetermined range between a finite minimum and a finite maximum;

classifying the identified subsets in one of a plurality of bins which arc defined on the basis of a predetermined metric associated with or derived from properties relating to the minutiae which are members of said identified subsets;

analyzing the geometrical correspondence between minutiae of the identified subsets of the claimant and enrollee fingerprints via affine transformation; and determining whether the claimant fingerprint and the enrollee fingerprint match on the basis of the analysis, wherein said analysis involves determining a plurality of proposed transformations proposed as matches between the claimant fingerprint and the enrollee fingerprint, in which the proposed transformations are each checked for consistency with each other, and wherein the consistency checking involves determining differences in parameters of the respective transformations.

34. A method of fingerprint verification suitable for determining whether a claimant is one of a number of enrollees, the method comprising:

identifying minutiae of an enrollee fingerprint, and minutiae of a claimant fingerprint;

selecting identified subsets of the enrollee minutiae and identified subsets of the claimant minutiae, in which each of the identified subsets has an associated index minutiae which is a member of that identified subset;

analyzing the geometrical correspondence between minutiae of the identified subsets of the claimant and enrollee fingerprints via affine transformation, in which a plurality of transformations are proposed that map one of the identified claimant subsets to one of the identified enrollee subsets, for respective identified subsets that meet a predetermined criterion, and the proposed transformations are checked for consistency with each other; and determining whether the claimant fingerprint and the enrollee fingerprint match on the basis of said analysis, wherein said analysis involves determining a plurality of proposed transformations proposed as matches between the claimant fingerprint and the enrollee fingerprint in which the proposed transformations are each checked for consistency with each other, and wherein two transformations are considered to be consistent with each other if the differences between transformation parameters of the two transformations are all below respective predetermined thresholds.

35. A method of fingerprint verification suitable for determining whether a claimant is one of a number of enrollees, the method comprising:

identifying minutiae of an enrollee fingerprint, and minutiae of a claimant fingerprint;

selecting identified subsets of the enrollee minutiae and identified subsets of the claimant minutiae, in which each of the identified subsets has an associated index minutiae which is a member of that identified subset;

analyzing the geometrical correspondence between minutiae of the identified subsets of the claimant and enrollee fingerprints via affine transformation; and determining whether the claimant fingerprint and the enrollee fingerprint match on the basis of the analysis, in which it is checked whether there is topological correspondence between selected identified claimant and enrollee subsets of minutiae, and a score representative of the correspondence between a claimant fingerprint and the enrollee fingerprint is calculated to determine that the claimant fingerprint and the enrollee fingerprint match, if the scores exceed a predetermined minimum value, wherein said analysis involves determining a plurality of proposed transformations proposed as matches between the claimant fingerprint and the enrollee fingerprint, in which the proposed transformations are each checked for consistency with each other, wherein the proposed transformations comprise those transformations that map one of the identified claimant subsets to one of the identified enrollee subsets, and wherein the proposed transformations which are checked for consistency are limited to a predetermined number of transformations which achieve the greatest correspondence between their respective identified claimant and enrollee subsets.

36. A method of fingerprint verification suitable for determining whether a claimant is one of a number of enrollees, the method comprising:

identifying minutiae of an enrollee fingerprint, and minutiae of a claimant fingerprint;

selecting identified subsets of the enrollee minutiae and identified subsets of the claimant minutiae, in which each of the identified subsets has an associated index minutiae which is a member of that identified subset, and members of the identified subsets are selected on the basis of whether the geometrical separation between the minutiae and the index minutiae falls within a predetermined range between a finite minimum and a finite maximum;

classifying the identified subsets in one of a plurality of bins which are defined on tile basis of a predetermined metric associated with or derived from properties relating to the minutiae which are members of said identified subsets;

analyzing the geometrical correspondence between minutiae of the identified subsets of the claimant and enrollee fingerprints via affine transformation, in which a plurality of transformations are proposed that map one of the identified claimant subsets to one of the identified enrollee subsets, for respective identified subsets that meet a predetermined criterion, and the proposed transformations are checked for consistency with each other; and determining whether the claimant fingerprint and the enrollee fingerprint match on the basis of the analysis, in which it is checked whether there is topological correspondence between selected identified claimant and enrollee subsets of minutiae, and a score representative of the correspondence between a claimant fingerprint and the enrollee fingerprint is calculated to determine that the claimant fingerprint and the enrollee fingerprint match, if the scores exceed a predetermined minimum value, wherein minutiae are eliminated from and/or not selected for inclusion in said identified subsets if the minutiae is determined to be positioned on or near the boundary of the claimant or enrollee fingerprint, and wherein a minutiae is determined to be positioned on or near the boundary of a fingerprint if it is less than a predetermined geometrical separation from any one of the sides of a rectangle defined by the co-ordinates of the most outlying minutiae of the fingerprint.

37. A method of fingerprint verification suitable for determining whether a claimant is one of a number of enrollees, the method comprising:

analyzing a claimant fingerprint and an enrollee fingerprint to determine whether the fingerprints match, in which said analysis involves determining the geometrical correspondence between minutiae of the claimant fingerprint and minutiae of the enrollee fingerprint via affine transformation;

wherein the analysis is performed using identified claimant subsets of minutiae from said claimant fingerprint and/or identified enrollee subsets of minutiae from said enrollee fingerprint, each of the identified subsets having an associated index minutiae which is a member of that identified subset, wherein minutiae are eliminated from and/or not selected for inclusion in said identified subsets if the minutiae is determined to be positioned on or near the boundary of the claimant or enrollee fingerprint, and wherein a minutiae is determined to be positioned on or near the boundary of a fingerprint if it is less than a predetermined geometrical separation from any one of the sides of a rectangle defined by the co-ordinates of the most outlying minutiae of the fingerprint.

38. An apparatus suitable for fingerprint verification in which it is determined whether a claimant is one of a number of enrollees, said computer program product comprising:

means for sampling a claimant fingerprint;

means for accessing a database of enrollee fingerprints;

means for identifying minutiae of an enrollee fingerprint and minutiae of a claimant fingerprint, from the sampled claimant fingerprint and accessed enrollee fingerprint respectively; and means for selecting identified subsets of the enrollee minutiae and identified subsets of the claimant minutiae;

means for analyzing the geometrical correspondence between minutiae of the identified subsets of the claimant and enrollee fingerprints via affine transformation;

means for determining whether the claimant fingerprint and the enrollee fingerprint match on the basis of the analysis, wherein minutiae are eliminated from and/or not selected for inclusion in said identified subsets if the minutiae is determined to be positioned on or near the boundary of the claimant or enrollee fingerprint, and wherein a minutiae is determined to be positioned on or near the boundary of a fingerprint if it is less than a predetermined geometrical separation from any one of the sides of a rectangle defined by the co-ordinates of the most outlying minutiae of the fingerprint.

39. A computer program product having a computer readable medium having recorded therein a computer program suitable for fingerprint verification in which it is determined whether a claimant is one of a number of enrollees, said computer program comprising code means for performing the following steps:

identifying minutiae of an enrollee fingerprint, and minutiae of a claimant fingerprint;

selecting identified subsets of the enrollee minutiae and identified subsets of the claimant minutiae;

analyzing the geometrical correspondence between minutiae of the claimant fingerprint and minutiae of the enrollee fingerprint via affine transformation and determining whether the claimant fingerprint and the enrollee fingerprint match on the basis of the analysis, wherein minutiae are eliminated from and/or not selected for inclusion in said identified subsets if the minutiae is determined to be positioned on or near the boundary of the claimant or enrollee fingerprint, and wherein a minutiae is determined to be positioned on or near the boundary of a fingerprint if it is less than a predetermined geometrical separation from any one of the sides of a rectangle defined by the co-ordinates of the most out lying minutiae of the fingerprint.

40. The computer program product as claimed in claim 39, wherein minutiae are selected for inclusion in said identified subsets if the geometrical separation between the minutiae and the index minutiae falls within a predetermined range between a finite minimum and a finite maximum.

41. The computer program product as claimed in claim 39, wherein the minutiae which are members of said identified subsets are ranked according to a predetermined ordering criterion indicative of a possible correspondence between the minutiae of different identified subsets of the same of different fingerprints.

42. The computer program product as claimed in claim 39, wherein said identified subsets are classified in one of a plurality of bins which are defined on the basis of a predetermined metric associated with or derived from properties relating to the minutiae which are members of said identified subsets.

43. The computer program product as claimed in claim 39, wherein said analysis further includes determining one or more proposed transformations that map one of the identified claimant subsets to one of the identified enrollee subsets, for respective identified subsets that meet a predetermined criterion.

44. The computer program product as claimed in claim 39, wherein said analysis involves determining a plurality of proposed transformations proposed as matches between the claimant fingerprint and the enrollee fingerprint, in which the proposed transformations are each checked for consistency with each other.

45. The computer program product as claimed in claim 39, wherein said determination involves checking whether there is topological correspondence between selected identified claimant and enrollee subsets of minutiae.

46. The computer program product as claimed in claim 39, wherein said determination involves calculating a score representative of the correspondence between a claimant fingerprint and the enrollee fingerprint for use in determining that the claimant fingerprint and the enrollee fingerprint match, if the scores exceed a predetermined minimum value.

* * * * *